United States Patent
Su-Man

(10) Patent No.: US 6,775,884 B2
(45) Date of Patent: Aug. 17, 2004

(54) CLIP-TYPE FRICTION HINGE DEVICE

(76) Inventor: Gwag Su-Man, 70-2 Wonmi-dong, Wonmi-ku, Pucheon-si, Kyunggi-do (KR)

( * ) Notice: Subject to any disclaimer, the term of this patent is extended or adjusted under 35 U.S.C. 154(b) by 108 days.

(21) Appl. No.: 10/072,262

(22) Filed: Feb. 7, 2002

(65) Prior Publication Data

US 2002/0162192 A1 Nov. 7, 2002

(30) Foreign Application Priority Data

May 7, 2001 (KR) .................................. 20-2001-13168

(51) Int. Cl.[7] .............................................. E05C 17/64
(52) U.S. Cl. .............................. 16/342; 16/321; 16/339; 16/345; 361/681; 361/682
(58) Field of Search ......................... 16/342, 321, 322, 16/339, 345; 361/681, 682, 680

(56) References Cited

U.S. PATENT DOCUMENTS

| | | | | |
|---|---|---|---|---|
| 3,910,627 A | * | 10/1975 | Meyer ...................... 296/97.12 |
| 4,489,974 A | * | 12/1984 | Warhol ...................... 296/97.5 |
| 5,333,356 A | * | 8/1994 | Katagiri ......................... 16/340 |
| 5,406,678 A | * | 4/1995 | Kaden et al. ................. 16/342 |
| 5,491,874 A | * | 2/1996 | Lowry et al. ................. 16/342 |
| 5,566,048 A | * | 10/1996 | Esterberg et al. ........... 361/681 |
| 5,896,622 A | * | 4/1999 | Lu ............................. 16/342 |
| 5,950,281 A | * | 9/1999 | Lu ............................. 16/342 |
| 6,085,388 A | * | 7/2000 | Kaneko ....................... 16/338 |
| 6,230,365 B1 | * | 5/2001 | Lu ............................. 16/342 |

* cited by examiner

Primary Examiner—Anthony Knight
Assistant Examiner—Mark Williams
(74) Attorney, Agent, or Firm—Pendorf & Cutliff

(57) ABSTRACT

A clip-type friction hinge device comprises a hinge body having insertion grooves on both insides thereof, a shaft being inserted to the each insertion groove of the hinge body on one side thereof and defining a central shaft when a monitor is pivotally moved, stands being formed on the outer circumference of other side of the shaft to be rotated about the shaft, clips each being inserted between the stand and the outer circumference of the shaft to adjust the amount of torque during the rotation of the stand, and torsion springs being fixedly installed on both outer circumferences of the hinge body to elastically support the stands relative to rotation of the stand.

7 Claims, 6 Drawing Sheets

CLIP-TYPE FRICTION HINGE DEVICE

BACKGROUND OF THE INVENTION

1. Field of the Invention

The present invention relates to a clip-type friction hinge device, and more particularly, to a hinge device used in a notebook computer and the like, that can be firmly installed by inserting a clip with an hole into the inside of a stand fixed to a computer monitor, can enable a user to freely adjust a torque by pivotally moving the stand about a shaft when the monitor is pivotally moved and making a portion where the hole is formed in the clip and a portion where the hole is not formed unequal in width to produce different torques in size on both sides of the direction of rotation, and can be easily assembled and stably used for a long time by reducing the number of components.

2. Background of the Related Art

In general, a friction hinge device is a very useful device for maintaining an object at a predetermined position or at a predetermined angle. For example, it is used to maintain a display of a notebook computer at a predetermined angle for a main body thereof or to properly adjust and maintain the screen angle of an LCD monitor. That is to say, in the notebook computer, the friction hinge device combines a cover in which a display is integrated to a main body so that the display can be opened/closed up and down. When the cover is opened, the friction hinge device serves to maintain the cover at a proper angle for the main body by the pressure of the spring and clip therein. In addition, the friction device generates a dynamic torque due to the friction when an object like a cover of a notebook computer is moved or rotated, thus restraining a rapid operation of the object and buffering the shock.

Such a friction hinge device has advantageous in its own way. However, most of the devices cannot be manufactured to be a structure proper to a recent trend pursuing the miniaturization/thinness of products. Or, even though it can be manufactured in that way, it is complicated to manufacture it and the durability thereof rapidly drops in the case that high torque should be maintained.

Recently, the friction hinge device of torsion spring mode has been developed as a hinge device for solving the above problems, as shown in FIG. 1.

The friction hinge device of torsion spring mode is constructed to adjust both the friction area and the pressure of a spring and to generate a frictional force of a constant size.

Referring to FIG. 1, the friction hinge device includes a housing 100, a rotary shaft 200, and a torsion spring 300.

The housing 100 is provided with an axial hole 101 and a fixing slot 102 formed on a lower part of the axial hole 101.

The rotary shaft 200 includes a first axis part being inserted to the axial hole 101 of the housing 100, a second axis part 202 being connected to an end part of the first axis part 201, and a fixing part 203 being connected to the second axis part 202 and extending to the opposite direction of the first axis part 201. The first axis part 201, the second axis part 202 and the fixing part 203 may be separately formed or integrally formed according to the conditions in manufacturing and assembling. A hole for screw 204 is formed on the fixing part 203 and the rotary shaft 200 is combined to the cover of the notebook computer by a screw (not shown) fastened through the hole 204. In this case, the housing 100 is similarly combined to the main body of the notebook computer by the fastening of a screw or the like.

The torsion spring 300 is comprised of a plurality of clip-type leaf springs, and is fixed to the housing 100 by being pressed to the rotary shaft 200 and inserted to the axial hole 101 of the housing 100 together with the rotary shaft 200.

FIG. 2 illustrates a front view of the friction hinge device of FIG. 1. The torsion spring 300 is inserted to the axial hole 101 of the housing 100 and the torsion spring 300 is fixed to the housing 100 not to be rotatable by fitting a downward projection part 301 of an arrow shape formed on the lower part thereof into the fixing slot 102 of the housing 100. Further, the rotary shaft 200 is pushed to a central hole of the torsion spring 300.

On the other hand, two oil grooves 302 facing against each other are formed at the inner circumference of the central hole 303 of the torsion spring 300, and lubricating oil is charged to the oil grooves. Thus, it is possible to reduce the friction resistance generated between the outer circumference of the rotary shaft 200 and the inner circumference of the central hole 303 of the torsion spring 300 during the rotation of the rotary shaft 200.

In such a friction hinge device, if the rotary shaft 200 is rotated (e.g., if the cover of a notebook computer is opened or the screen angle of an LCD monitor is adjusted), the rotary shaft 200 receives the torque due to the friction with the torsion spring 300, and thereby a rapid rotation is restrained to buffer the shock. Thereafter, when the rotation is stopped at a predetermined rotary angle, the rotary shaft 200 is fixedly maintained at the angle by the pressure due to the tightening elasticity of the torsion spring 300. Since the torsion spring 300 is fixed to the housing 100 not to be rotatable, the generation of the torque due to the friction during the rotation of the rotary shaft 200 is ensured. Since the torsion spring 300 of a closed circle shape stably supports the rotation of the rotary shaft 200 and the friction resistance is reduced by the lubrication of oil, the rotation of the rotary shaft 200 is smoothly performed.

The conventional friction hinge device, however, has a drawback that it requires much time and efforts to push the rotary shaft 200 into the torsion spring 300 since the torsion spring 300 is formed to be a closed circle shape.

The conventional friction hinge device has another drawback that it cannot freely adjust the torque in a wanted direction since the torques are equally produced in size on both sides of the direction of rotation. In particular, there are some cases that require different torques on the both sides of the direction of rotation in order to easily fix and maintain the monitor and so on at the proper angle. The conventional friction hinge device has still another disadvantage that it cannot make the torques unequally formed on the both sides.

SUMMARY OF THE INVENTION

Accordingly, the present invention is directed to a clip-type friction hinge device that substantially obviates one or more problems due to limitations and disadvantages of the related art.

An object of the present invention is to provide a clip-type friction hinge device having a simple structure capable of freely adjusting a torque in a wanted direction, being easily assembled, and improving convenience in use.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a clip-type friction hinge device comprises a hinge body having insertion grooves on both insides thereof, a shaft being inserted to the each insertion groove of the hinge body on one side thereof and defining a central shaft when a monitor is pivotally moved, stands being formed on the outer circumference of other side of the shaft to be rotated about the shaft, clips each being inserted between the stand and the outer circumference of the shaft to adjust the amount of torque during the rotation of the stand, and torsion springs being fixedly installed on both outer circumferences of the hinge body to elastically support the stands relative to rotation of the stand.

The clip has a shaft insertion part to which the shaft is inserted at the center thereof, and a square hole on a side thereof or grooves on both sides thereof to adjust the amount of torque during rotation.

The hinge body is combined to a main body of a notebook computer, and fixes the stands formed on both sides of the hinge body, so as to rotate the stands in both directions when the monitor is pivotally moved.

The clip inserted to the inside of the stand is rotated in the same direction as the stand during the rotation of the stand, and a hole portion formed in the clip and a portion where any hole is not formed are different in width, so as to give a torque deviation according to each direction.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiments of the present invention, examples of which are illustrated in the accompanying drawings.

Figure 1:
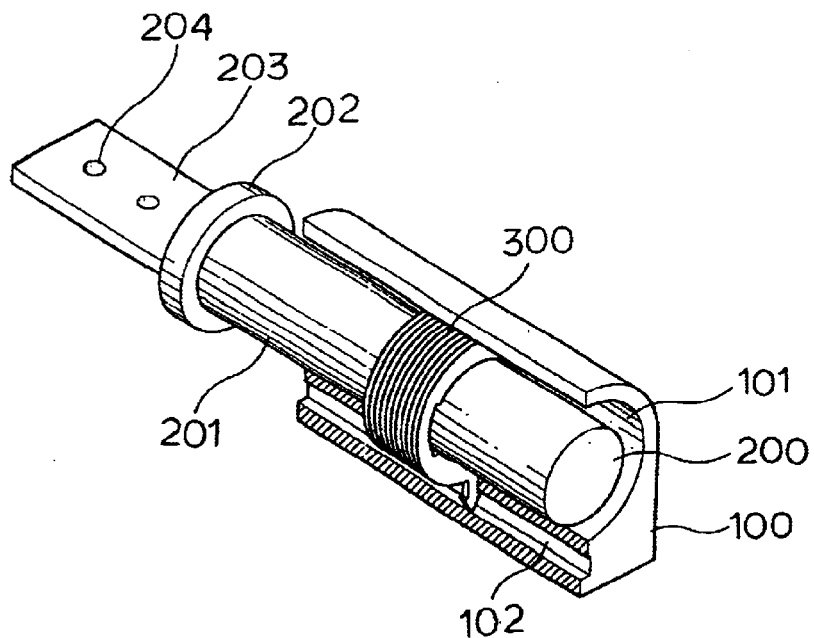
FIG. 1 illustrates a partial sectional and perspective view of a structure of a conventional clip-type friction hinge device.
Figure 2:
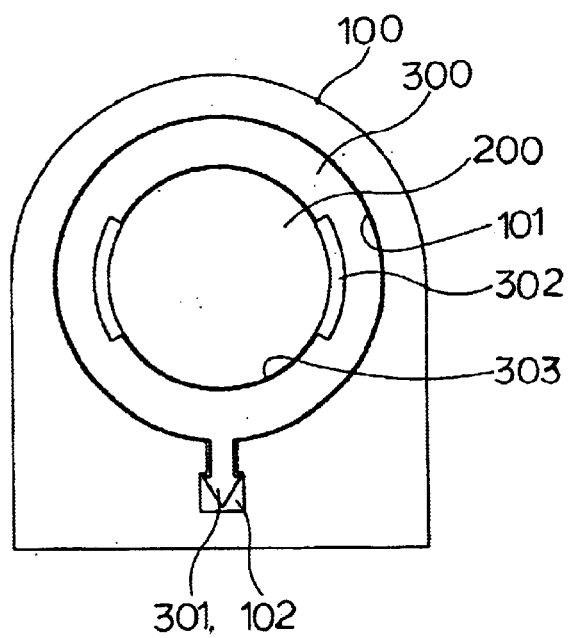
FIG. 2 illustrates a front view of the friction hinge device of FIG. 1.
Figure 3:
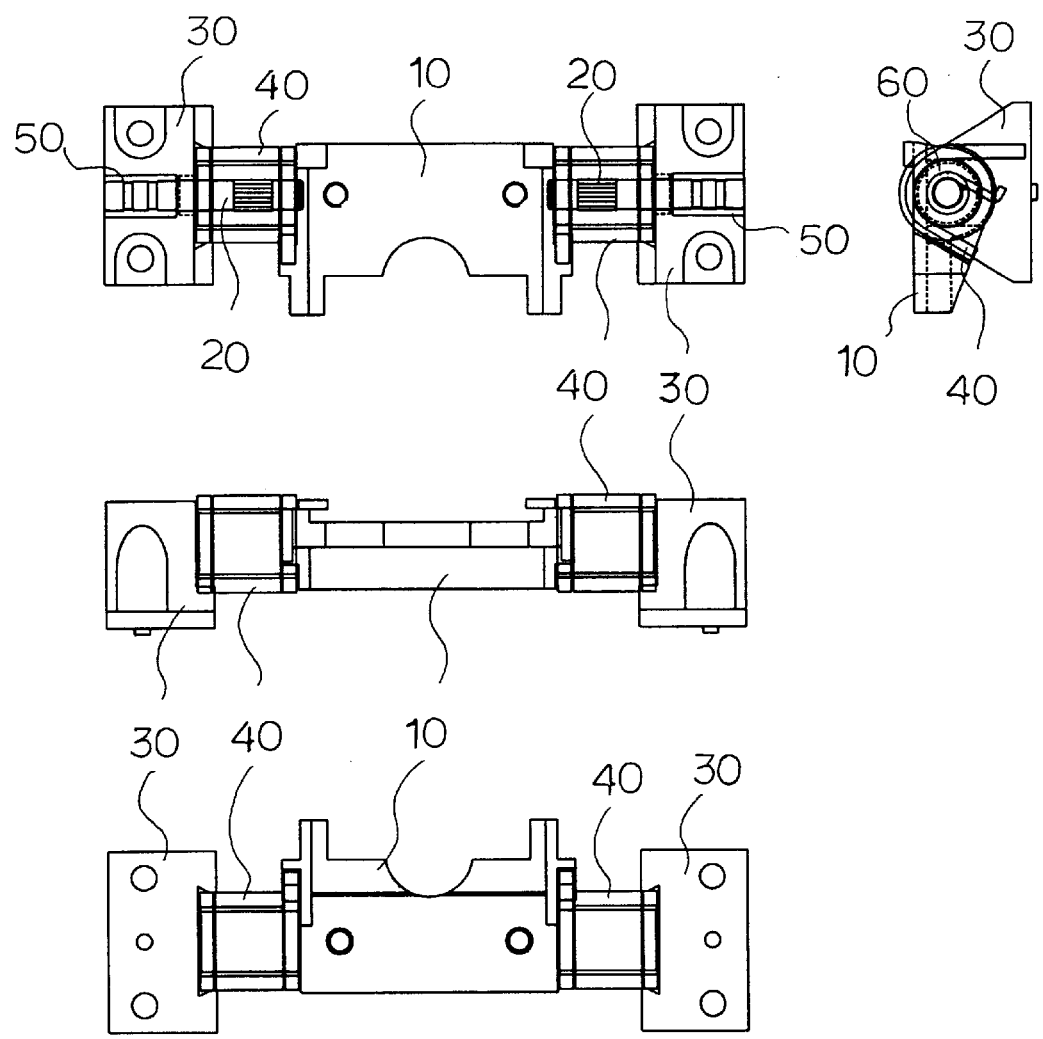
FIG. 3 illustrates an exemplary view of an overall construction of a clip-type hinge device according to the present invention.
Figure 4:
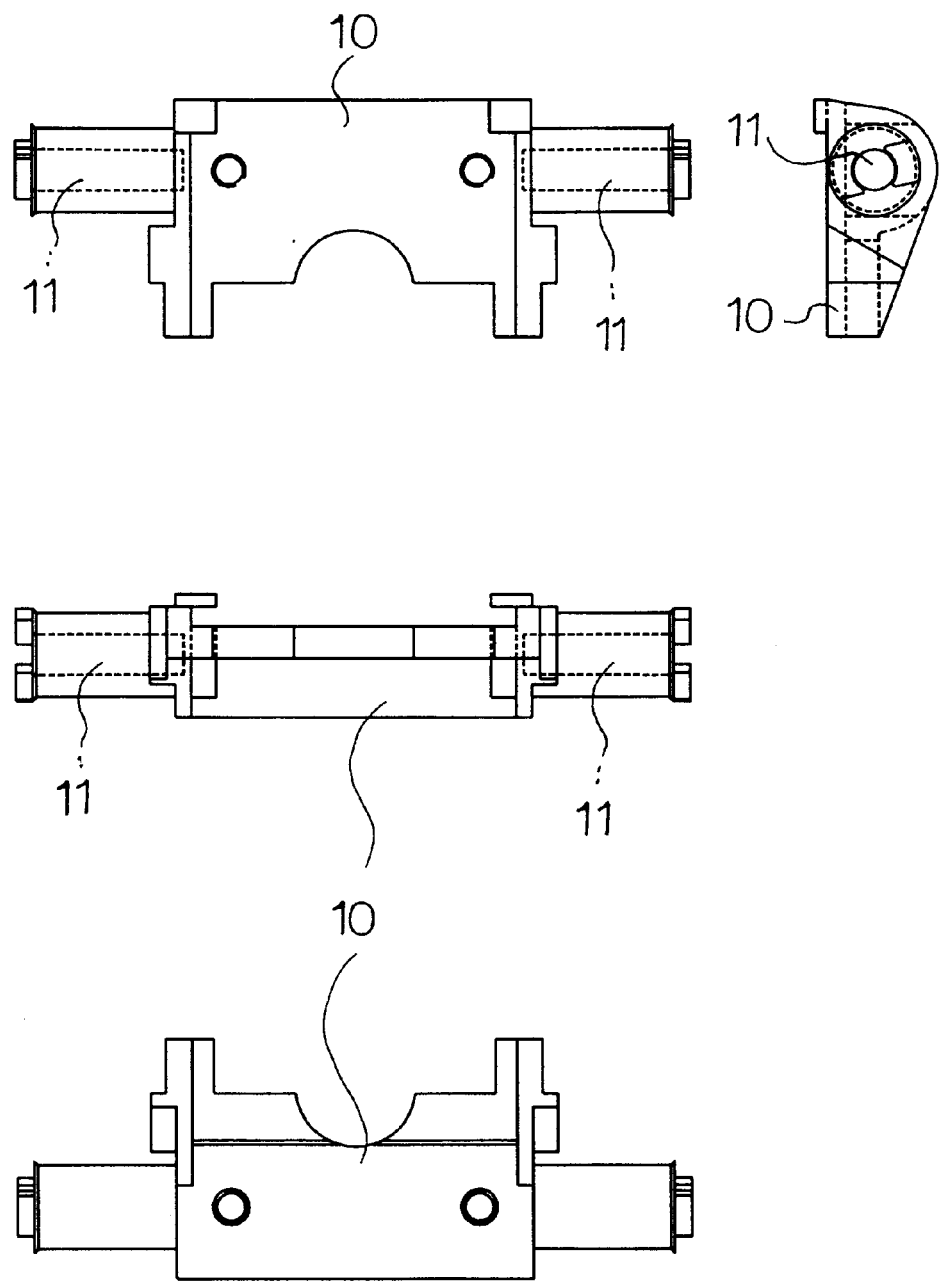
FIG. 4 illustrates an exemplary view of a hinge body of the clip-type hinge device according to the present invention.
Figure 5:
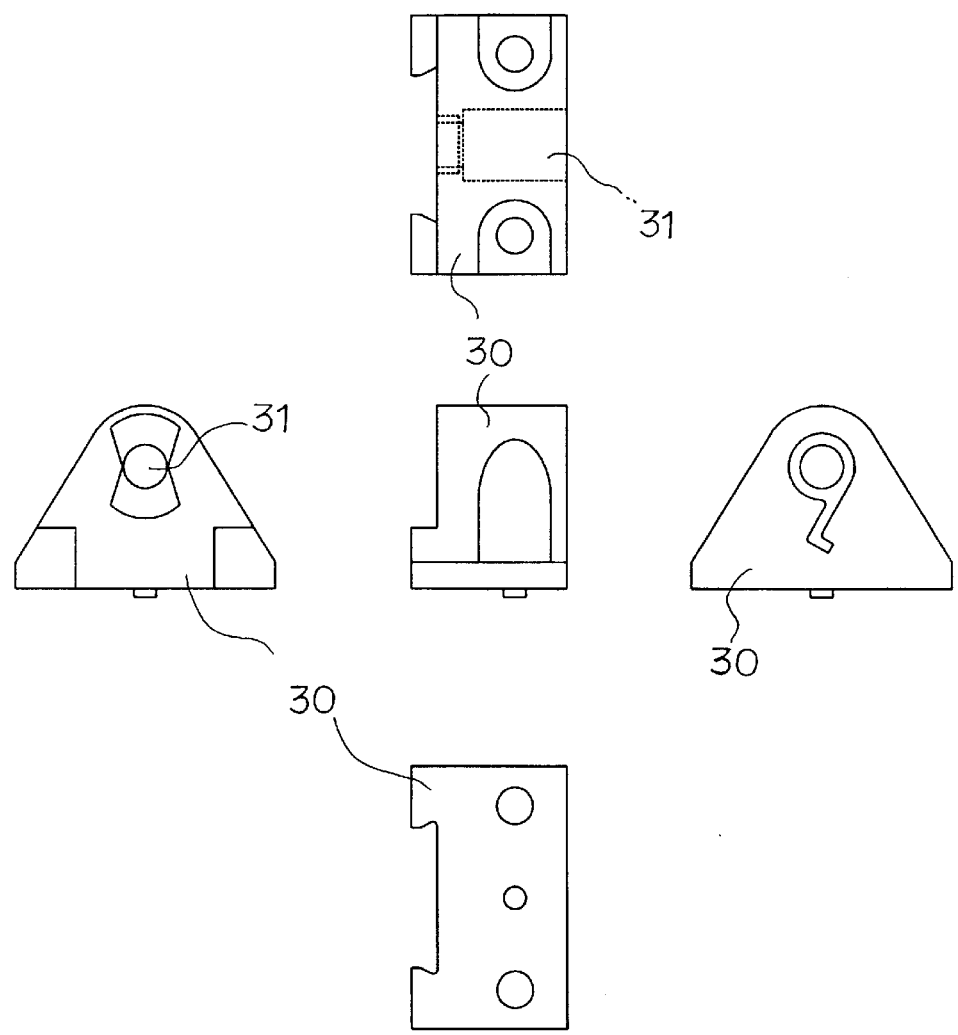
FIG. 5 illustrates an exemplary view of a stand of the clip-type hinge device according to the present invention.
Figure 6:
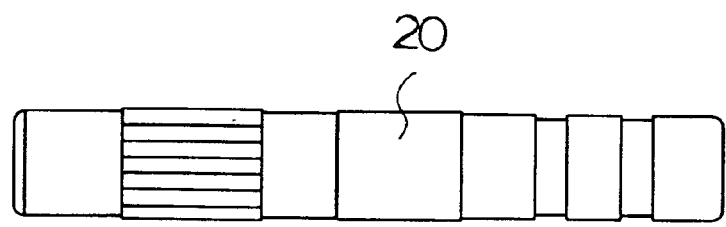
FIG. 6 illustrates an exemplary view of a shaft of the clip-type hinge device according to the present invention.
Figure 7:
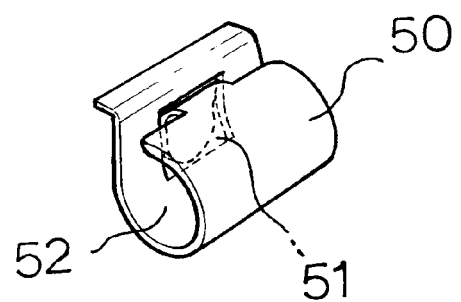
FIG. 7 illustrates a perspective view of a clip of the clip-type hinge device according to the present invention.
Figure 8:
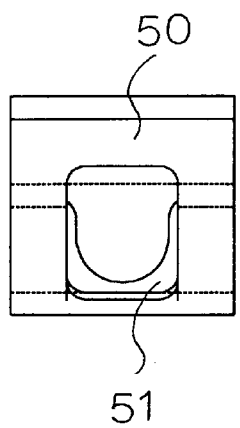
FIG. 8 illustrates an exemplary view of the clip of the clip-type hinge device according to the present invention.
Figure 8:
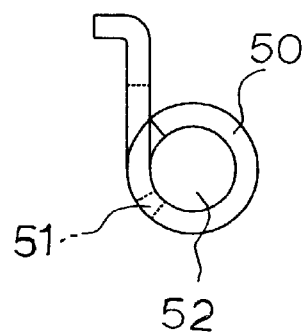

FIG. 3 illustrates an exemplary view of an overall construction of a clip-type hinge device according to the present invention, FIG. 4 illustrates an exemplary view of a hinge body of the clip-type hinge device according to the present invention, FIG. 5 illustrates an exemplary view of a stand of the clip-type hinge device according to the present invention, FIG. 6 illustrates an exemplary view of a shaft of the clip-type hinge device according to the present invention, FIG. 7 illustrates a perspective view of a clip of the clip-type hinge device according to the present invention, and FIG. 8 illustrates an exemplary view of the clip of the clip-type hinge device according to the present invention.

A hinge device used in a notebook computer, a monitor, and the like includes a hinge body 10 being fixedly combined to a main body of the hinge device, stands 30 being coupled on both sides of the hinge body 10 to be rotatable, a shaft 20 being inserted to the hinge body 10 and the stands 30 to define a central shaft, torsion springs 40 for elastically supporting the stands 30 relative to the hinge body 10, and clips 50 being rotatable along with the stands 30 about the shaft 20 inside the stands 30.

The hinge body 10 includes insertion grooves 11 on both insides thereof, so that a side of the shaft 20 forming the central shaft during rotation is inserted to the each insertion groove 11. Each of the stands 30 includes a groove 31, so that other side of the shaft 20 is inserted to the groove 31.

Each of the clips 50 is inserted between the groove 31 of the stand 30 and the outer circumference of the shaft 20 inserted to the stand 30 to adjust the amount of torque during rotation of the stand 30.

One end (50a) of the clip (50) is inserted into the locked groove (31a) formed as one body with the hole (31) of the stand (30). Hence the clip is fixed at one end, the invention has large deviation of torque between left and right.

The clip 50 includes a shaft insertion part 52 to be inserted to the shaft 20, and a square hole 51 on a side thereof for the amount of torque to be varied according to a necessary direction, wherein one end of the clip is smaller in size than the hole 51 so as to be inserted to the hole 51.

Hence, in the clip, a portion where the hole 51 is formed and a portion where the hole 51 is not formed are unequal in width.

Figure 9A:
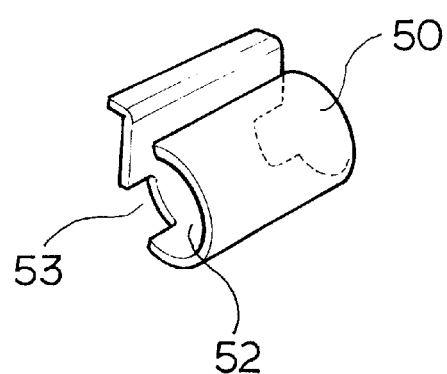
FIG. 9a illustrates a perspective view of an embodiment of a clip used in the clip-type hinge device according to the present invention.
Figure 9B:
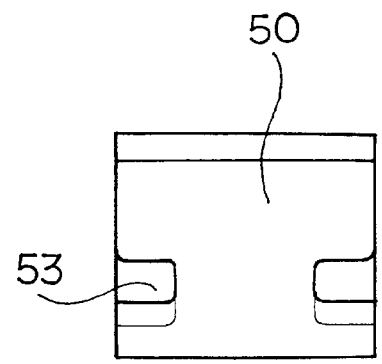
FIG. 9b illustrates an exemplary view of the embodiment of the clip used in the clip-type hinge device according to the present invention.

Further, as illustrated in FIGS. 9a and 9b, recesses 53 are formed on both sides of the clip 50 and thus the end of the clip 50 is different in width from the width of the clip.

In consequence, when the monitor is opened and closed, a torque deviation can be generated. That is to say, when the monitor is opened, the width of the clip 50 is smaller and smaller amount of torque is needed, whereas when the monitor is closed, the width of the clip 50 is larger and larger amount of torque is needed.

The torsion springs 40 are installed on the hinge body 10 and the stands 30 and elastically support the stands 30 relative to the hinge body 10, whereby the stands 30 can be rotated while receiving a torque caused due to a friction when the stands 30 are rotated.

The hinge body 10 and the stands 30 are made of zinc or engineering plastic, whereby the manufacturing cost can be reduced and the same effect as the conventional art can be achieved.

Furthermore, the hinge body 10 and the shaft 20 may be separately formed or integrally formed according to the conditions in manufacturing and assembling. The hinge body 10 may be die cast or injection molded, and the shaft 20 may be integrally inserted to the hinge body 10 through an injection molding process.

A ring 60 is inserted between the groove 31 of the stand 30 and the outer circumference of the end of the shaft 20 so as for the clip 50 not to be separated from the groove 31 of the stand 30.

Operation of the present invention will be explained with reference to the aforesaid construction.

The hinge body 10 is inserted to the main body, e.g., the notebook computer, and the stands 30 are fixed to the rotating monitor. When the monitor is opened, the stands 30 are pivotally moved about the shaft 20. In this case, since the hole 51 is formed in the clip 50 inserted to the inside the stand 30, the width of the clip 50 is smaller and accordingly smaller amount of torque is needed. In contrast, when the monitor is closed, since the width is larger than that of the portion where the hole 51 of the clip 50 is formed and accordingly greater amount of torque is needed.

Moreover, when the monitor is opened, the clip 50 inserted to the shaft 20 becomes wider by the pivotal movement of the stand 30. At this time, right and left sides of the clip 50 are become wider while maintaining the equal areas, thereby preventing distortion.

Accordingly, although the device is excessively used, the proper angle can be always maintained since the clip doesn't cause any distortion. Moreover, the hinge can be easily assembled since only one clip 50 is embedded inside the stand 30.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

As described above, in the hinge device used in the computer and so on, the clip is inserted into the inside of the rotating stand, the hole and the shaft insertion part are formed in the clip and the shaft is inserted to the shaft insertion part. When the monitor is opened and closed, the stand is pivotally moved and thus the clip is pivotally moved. Since the width of the clip is varied by whether the existence of the hole in the clip, the amount of torque is varied, thereby advantageously achieving convenience in use.

The hinge device has another advantage of preventing distortion since when being rotated, the clip becomes wider in the equal areas.

The hinge device has yet another advantage of being simply assembled since it is possible that only one clip is used.

What is claimed is:

1. A clip-type friction hinge device comprising:

a hinge body having, a first side, a second side, and an insertion groove on each side;

a first and second shaft, each having a first end and a second end, wherein the first end of each shaft is inserted into one of each insertion groove of the hinge body;

two stands each having a hole, wherein each second end of each shaft is inserted into one of the holes of each stand, wherein the hinge body, the shaft and the stands form a central shaft, wherein the stands rotate around the central shaft;

at least two clips, each clip being inserted between one of each hole of each stand and the outer circumference of the second end of the shaft, wherein each clip adjust a torque during the rotation of the stand; and at least two torsion springs installed between the hinge body and each stand;

wherein each clip further comprises an end inserted into a locked groove formed as one body with the hole of each stand, and wherein each clip includes two sides, an insertion part to be inserted onto the shaft, and a square hole or groove on both sides of the clip.

2. The clip-type friction hinge device according to claim 1, wherein the clip is fixed at one end.

3. The clip-type friction hinge device according to claim 1, further comprising a ring inserted between the hole of the stand and the outer circumference of the shaft.

4. The clip-type friction hinge device according to claim 1, wherein the clip inserted into the stand rotates in the same direction as the stand during the rotation of the stand.

5. The clip-type friction hinge device according to claim 1, wherein one end of the clip is smaller in size than the square hole or groove on the side of the clip.

6. The clip-type friction hinge device according to claim 1, wherein clip further includes a square hole or groove on both sides of the clip.

7. The clip-type friction hinge device according to claim 1, wherein the hinge body and the shaft are integrally formed.

* * * * *